B. ROSENBAUM.
PERISCOPE FOR SUBMARINE AND SUBMERSIBLE CRAFT.
APPLICATION FILED JUNE 17, 1913.

1,110,827. Patented Sept. 15, 1914.

Witnesses:
P. F. Nagle
L. Douville

Inventor:
By Bedrich Rosenbaum
Wiedersheim & Fairbanks
Attorneys.

UNITED STATES PATENT OFFICE.

BEDRICH ROSENBAUM, OF DUMBARTON, SCOTLAND.

PERISCOPE FOR SUBMARINE AND SUBMERSIBLE CRAFT.

1,110,827.　　　　Specification of Letters Patent.　　Patented Sept. 15, 1914.

Application filed June 17, 1913.　Serial No. 774,099.

*To all whom it may concern:*

Be it known that I, BEDRICH ROSENBAUM, a subject of the Emperor of Austria-Hungary, residing at Dumbarton, Scotland, have invented certain new and useful Improvements in Periscopes for Submarine and Submersible Craft, of which the following is a specification.

Periscopes for under-water craft are, at present, generally made either with a single tube which is fitted slidably in a guide support on the shell of the boat and packed tightly against ingress of water by a stuffing box and gland, or with two tubes, an inner tube or periscope proper carrying the lens (or lenses) and reflecting prism, and an outer protecting tube, the tubes being capable of sliding telescopically within the guide support which is provided with a stuffing gland to insure water tightness. In the first case the periscope is difficult to rotate owing to the friction of the packing in the stuffing box, and, in the second case, while the periscope can be easily rotated, the upper end of the outer tube is provided with a glass cap or cover which is not only expensive to make but is apt to distort or refract the rays of light and is also easily broken.

Under my invention I dispense with the glass cap or cover entirely and I cause the head only of the periscope tube to project beyond the outer protecting tube and I provide a watertight joint at the top of the protecting tube, said joint being, preferably, so arranged that when the head of the periscope is above the water the joint is relaxed either automatically or otherwise so that the inner tube can be easily rotated, while, when the periscope is submerged, the joint is tightened either automatically or otherwise so as to prevent ingress of water. This joint can be made in various ways.

In order that my invention may be clearly understood I have hereunto appended an explanatory sheet of drawings which shows a periscope constructed in accordance with my invention.

Figure 1:
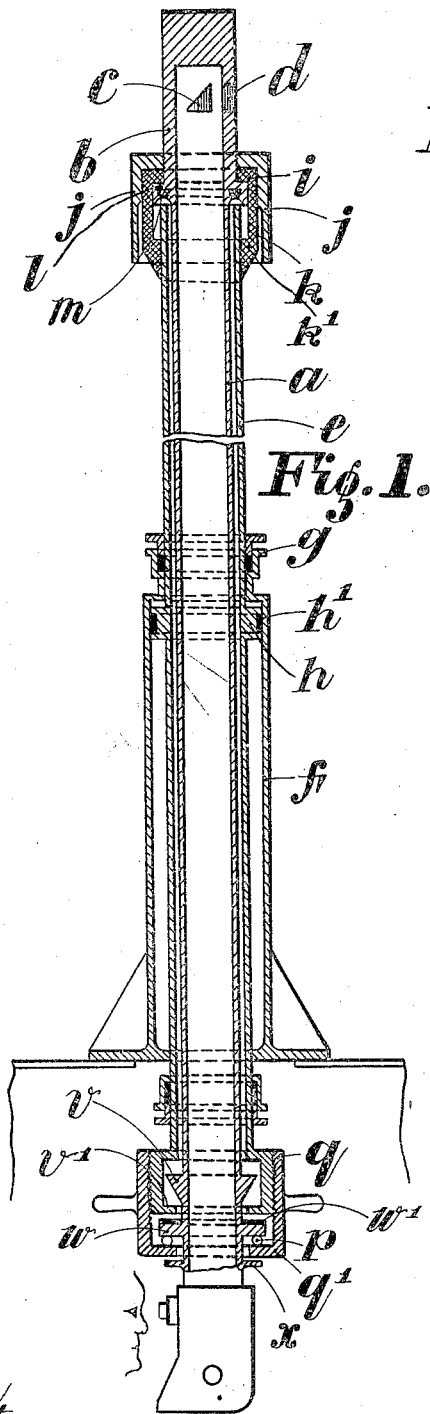
Figure 2:
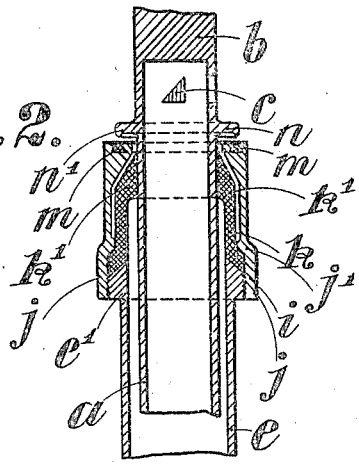
Figure 3:
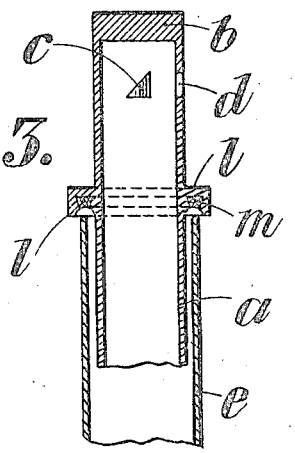
Figure 4:
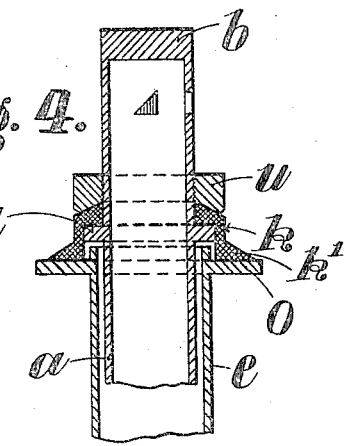

Figure 1 represents, in sectional elevation, one mode of constructing the periscope. Figs. 2 to 4 represent, in sectional elevation, other modes of construction.

In the construction shown at Fig. 1, the inner periscope tube $a$ is provided with a headpiece $b$ made of metal and carrying the prism $c$ and lens $d$, said headpiece projecting a short distance beyond the upper end of the outer protecting tube $e$, which outer tube is slidably mounted in a guide support $f$, provided with a stuffing gland $g$ and piston $h$ with packing $h^1$ to insure watertightness. Between the headpiece and the outer tube there is a special form of joint which (in this figure) takes the form of a rubber sleeve $k$ having a thickened and tapered off part $k^1$ at its lower end. This sleeve is arranged concentric with and outside of the outer tube and, at its upper end, it is secured to the headpiece by means of an inner flange on it which flange is held tightly between an external collar $l$ on the headpiece and an inner flange on a protecting guard or cover $j$, this guard being screwed on the headpiece. The lower end of the sleeve $k$ is so arranged as to rest lightly against the surface of the outer tube. The periscope tube $a$ passes down the center of the protecting tube $e$ without contacting with the same and, at its lower end, rests on ball bearings $p$ while, at its upper end, it is held in position, by the rubber sleeve $k$.

The construction is such that when the periscope is submerged, the pressure of the water acts on the sleeve $k$ and causes its part $k^1$ to tightly embrace the outer tube thereby effecting a water-tight closure, while, when the head of the periscope is above the water, the sleeve automatically relaxes its grip so that the inner tube can be very easily turned as there is practically no friction between the part $k^1$ and the tube $e$. This feature of easy rotation is a matter of considerable importance. Another important feature is that vibrations transmitted to the protecting tube $e$ from the support $f$ are not transmitted to the periscope but are cushioned or damped by the interposed rubber sleeve $k$.

If so desired, in conjunction with the sleeve joint aforesaid, there may be a second joint between the inner and outer tubes. To this end the collar $l$ may be provided with a rubber, leather, or other annular seating $m$ which is capable of being pressed on or against the upper end of the outer tube in such manner as to form a tight joint. This pressure can be effected by a relative movement between the inner and outer tubes produced automatically, by motive mechanism, or by means of a screwed ring or other device manipulated by hand. The arrangement may, as shown at Fig. 1, be such that when the periscope is above water the inner tube can be raised relatively with the outer tube by turning the screwed ring $q$ so as to open the joint between the tube $e$ and ring $m$, thereby enabling the periscope to be easily turned, while when the periscope is submerged the ring $q$ can be turned so as to lower the seating $m$ on to the tube $e$, against which it can be tightly held by gravity or otherwise.

For additional security in case the periscope or its protecting tube may be broken or damaged to such extent as to admit water a double valve arrangement can be provided at the lower end of the periscope. This arrangement comprises a cone $v$ formed on the tube $a$ and adapted to seat against the upper edge of an inner flange $v^1$ on the lower end of the protecting tube $e$ and a collar $w$ on the periscope tube, provided with a rubber or leather face $w^1$ adapted to seat against the lower side of the flange $v^1$. The space between the top of the tube $e$ and the ring $m$ is less than that between $w^1$ and $v^1$. $x$ is an additional collar on the tube $a$ and at the underside of the flange $q^1$ of ring $q$. Now, should the top of the periscope be broken off the ring $q$ can be turned by hand and no matter which way it is turned a closure is effected either between $v$ and $v^1$ or between $w$ and $v^1$. The collar $x$ insures a positive downward movement of the valve $v$ (on turning the ring $q$) should the weight on the tube $a$ not be sufficient.

In the construction shown at Fig. 2 the rubber sleeve $k$ is secured to the outer tube $e$ and its part $k^1$ bears on and can be closed by the water pressure, tightly against the periscope tube $a$. The guard $j$ is screwed at its lower end to the part $e^1$ of the tube $e$ and an internal shoulder $j^1$ on it pinches the lower end of the sleeve tightly against this part $e^1$. The upper end of the guard may have an annular rubber or other soft seating $m$ on which the annular knife edge $n^1$ on a collar $n$ of the periscope tube can seat tightly when this tube is moved downward.

As shown at Fig. 3, the sleeve joint may be dispensed with the water-tight closure being simply effected by lowering the inner tube $a$ so that the annular ring $m$ of flexible material, in a recess in the collar $l$ of the headpiece $b$, will engage with the top of the outer tube $e$ and in so doing form a tight joint. While I may use this simple joint alone I always prefer to use it in combination with the sleeve joint.

In the construction shown at Fig. 4 a short sleeve or ring $k$ of rubber or other suitable flexible material is adapted to automatically close against the upper surface of a flange $o$ on the tube $e$ when the periscope is submerged and the pressure of water forces the ring tightly against said flange so that ingress of water will be prevented. The ring is held in position on the tube $a$ by means of a collar $l$ and screw nut $u$. When the inner tube is raised there is no frictional contact between $k$ and $o$, so that the periscope can be easily turned. The part $k^1$ of the ring is made broad and tapered to insure a tight joint under external water pressure.

In all the constructions shown it will be understood that the periscope tube may be raised and lowered automatically or by hand. In some cases, however, it may be preferred to have the automatically acting sleeve or ring joint only the tubes being without relative longitudinal movement.

Having now fully described my invention what I claim and desire to secure by Letters Patent is:—

1. A periscope having, in combination, a vertically adjustable outer protecting tube, an inner periscope tube having the head only thereof arranged to project beyond the outer tube, and a watertight joint between said tubes.

2. A periscope having, in combination, a vertically adjustable outer protecting tube, an inner rotatable tube having the head only thereof arranged to project beyond the outer tube, and a water tight joint between said tubes and at the top of the outer tube.

3. A periscope having, in combination, an inner periscope tube, an outer tube and a joint between the tubes which, when the periscope is under water, can be tightened and, when the head of the periscope is out of the water, can be relieved.

4. A periscope having, in combination, an outer tube, an inner tube carrying the optical parts and the head of which projects beyond the inner tube and a joint between the inner and outer tubes which, when the periscope is under water, can be tightened and, when the head of the periscope is out of the water, can be relieved.

5. A periscope having, in combination, an outer tube, an inner tube carrying the optical parts and the head of which projects beyond the inner tube and a flexible joint between the inner and outer tubes which, when the periscope is under water, can be tightened and, when the head of the periscope is out of the water, can be relieved.

6. A periscope having, in combination, an inner periscope tube, an outer tube and a joint between the tubes which, when the periscope is under water, can be automatically tightened and, when the head of the periscope is out of the water, can be relieved.

7. A periscope having, in combination, an inner periscope tube, an outer tube and a flexible joint between the tubes which, when the periscope is under water, can be tightened and, when the head of the periscope is out of the water, can be relieved.

8. A periscope having, in combination, an inner periscope tube, an outer tube and a rubber joint between the tubes which, when the periscope is under water, can be tightened and, when the head of the periscope is out of the water, can be relieved.

9. A periscope having, in combination, an outer tube, an inner tube carrying the optical parts and the head of which projects beyond the outer tube and a sleeve joint between the inner and outer tubes which, when the periscope is under water, can be tightened and, when the head of the periscope is out of the water, can be relieved.

10. A periscope having, in combination, a vertically adjustable outer tube, an inner tube carrying the optical parts and the head of which projects beyond the outer tube and a rubber sleeve joint between the inner and outer tubes which, when the periscope is under water, can be tightened and, when the head of the periscope is out of the water, can be relieved.

11. A periscope having, in combination, an outer tube, an inner tube carrying the optical parts and the head of which projects beyond the outer tube and a sleeve joint between the inner and outer tubes which, when the periscope is under water, is automatically tightened and, when the head of the periscope is out of the water, is automatically relieved.

12. A periscope having, in combination, an inner periscope tube, an outer tube and a double joint between the tubes which, when the periscope is under water, can be tightened and, when the head of the periscope is out of the water, can be relieved.

13. A periscope having, in combination, an outer tube, an inner tube carrying the optical parts and the head of which projects beyond the outer tube, a joint between the inner and the outer tubes, and a second joint between the inner and outer tubes outside of the first joint.

14. A periscope having, in combination, an outer tube, an inner tube carrying the optical parts and the head of which projects beyond the outer tube, a joint between the inner and the outer tubes and a second joint between the inner and outer tubes outside of the first joint, both joints being capable of being relieved when the head of the periscope is out of the water.

15. A periscope having, in combination, an outer tube, an inner tube carrying the optical parts and the head of which projects beyond the outer tube, a joint between the inner and the outer tubes and a second joint between the inner and outer tubes outside of the first joint the inner joint being capable of relaxation by a movement of the inner tube relatively with the outer tube and the outer joint being capable of automatic relaxation.

16. A periscope having, in combination, an outer tube, an inner tube carrying the optical parts and the head of which projects beyond the outer tube, a joint between the inner and the outer tubes and a second joint between the inner and outer tubes outside of the first joint the inner joint being capable of relaxation by a movement of the inner tube relatively with the outer tube produced by mechanical means and the outer joint being capable of automatic relaxation.

17. A periscope having, in combination, an inner periscope tube, an outer tube concentric of the inner tube, means on the outer tube for rotatably supporting the lower end of the inner tube and a joint between the tubes which, when the periscope is under water, can be tightened and, when the head of the periscope is out of the water, can be relieved.

18. A periscope having, in combination, an inner periscope tube, an outer tube concentric of the inner tube, adjustable means on the outer tube for rotatably supporting the lower end of the inner tube and a joint between the tubes which, when the periscope is under water, can be tightened and, when the head of the periscope is out of the water, can be relieved.

19. A periscope having, in combination, an inner periscope tube, an outer tube concentric of the inner tube, ball bearing means on the outer tube for rotatably supporting the lower end of the inner tube and a joint between the tubes which, when the periscope is under water, can be tightened and, when the head of the periscope is out of the water, can be relieved.

20. A periscope having, in combination, an outer tube, an inner tube carrying the optical parts and the head of which projects beyond the outer tube and a sleeve joint between the inner and outer tubes which, when the periscope is under water, can be tightened and, when the head of the periscope is out of the water, can be relieved and a guard to protect said sleeve.

21. A periscope having, in combination, an outer tube, an inner tube carrying the optical parts and the head of which projects beyond the outer tube and a flexible sleeve made, at one end thereof, with a thickened and tapered part which bears against one tube the sleeve being secured at its opposite end to the other tube.

22. A periscope having, in combination, an outer tube, an inner tube carrying the optical parts and the head of which projects beyond the outer tube and a rubber sleeve secured to the one tube and extending concentrically of the other tube the sleeve being made with an inwardly projecting portion which bridges the gap between the two tubes and effects a closure.

23. A periscope having, in combination, an outer tube, an inner tube carrying the optical parts and the head of which projects beyond the outer tube and a rubber sleeve secured to the one tube and extending concentrically of the other tube the sleeve being made with an inwardly projecting and tapering portion which bridges the gap between the two tubes and effects a closure.

24. A periscope having, in combination, an outer tube, an inner tube carrying the optical parts and the head of which projects beyond the outer tube and a rubber sleeve removably secured to the one tube and extending concentrically of the other tube the sleeve being made with an inwardly projecting portion which bridges the gap between the two tubes and effects a closure.

25. A periscope having, in combination, an inner periscope tube, an outer tube and a joint between the tubes which is slidably arranged and which, when the periscope is under water, can be tightened and, when the head of the periscope is out of the water, can be relieved.

26. A periscope having, in combination, an inner periscope tube, an outer tube and a joint between the tubes which is slidably and rotatably arranged and which, when the periscope is under water, can be tightened and, when the head of the periscope is out of the water, can be relieved.

27. A periscope having, in combination, an inner periscope tube with a valve at the lower end thereof, an outer periscope tube, a joint between the tubes which, when the periscope is under water, can be tightened and, when the head of the periscope is out of the water can be relieved, and means whereby the valve at the lower end of the inner tube can be closed.

28. A periscope having, in combination, an inner periscope tube with a conical valve at the lower end thereof, an outer periscope tube with a seating at the lower end thereof, a joint between the tubes which, when the periscope is under water, can be tightened and when the head of the periscope is out of the water can be relieved and means whereby the valve at the lower end of the inner tube can be closed against its seating.

29. A periscope having, in combination, an inner periscope tube with a double valve at the lower end thereof, an outer periscope tube with a valve seating against which the double valve is adapted to close, means for closing the valve, a joint between the tubes which, when the periscope is under water, can be tightened and when the head of the periscope is out of the water can be relieved and means whereby the valve at the lower end of the inner tube can be closed.

30. A periscope having, in combination, an outer protecting tube, an inner periscope tube having the head only thereof arranged to project beyond the outer tube, and a watertight joint between said tubes, both said tubes being capable of vertical adjustment.

31. A periscope having, in combination, an outer protecting tube, an inner periscope tube having the head only thereof arranged to project beyond the outer tube, and a watertight joint between said tubes, both said tubes being capable of vertical adjustment and the inner tube being capable also of an independent vertical and angular adjustment.

In testimony whereof I affix my signature in presence of two witnesses.

BEDRICH ROSENBAUM.

Witnesses:
STANLEY DUNLOP,
CECIL C. GALL.